March 9, 1954

D. A. MARRA 2,671,501

CUTTING TORCH TIP

Filed April 28, 1948

Inventor
Daniel A. Marra
By Christy Parmelee and Strickland
his Attorneys

Patented Mar. 9, 1954

2,671,501

UNITED STATES PATENT OFFICE 2,671,501

CUTTING TORCH TIP

Daniel A. Marra, Cheswick, Pa.

Application April 28, 1948, Serial No. 23,670

2 Claims. (Cl. 158—27.4)

This invention relates to blow-pipe tips, particularly to cutting torches, and consists of certain new and useful improvements in tip structure.

A cutting torch ordinarily (but not always) is carried in the hand of a workman. It is connected to supplies of combustible gas and of oxygen under pressure, and the connections are flexible, that the instrument may be freely manipulated.

The requisites of a cutting torch are that it shall deliver through its tip, and successively as the operation progresses, first, a heating flame that, brought to play upon the metal article to be cut, shall bring the metal in the immediate region of attack to substantially the temperature of combustion. When such temperature has been attained, it is requisite, second, that the torch shall deliver to the so heated region a stream of oxygen. The oxygen so delivered burns (cuts) the heated metal, and the burning of the metal releases heat, so that the metal is progressively, beginning with the region of initial heating and continuing therefrom, brought to the temperature of combustion, and progressively cut through. Additionally, it is ordinarily a matter of convenience, if not necessity, that at all times when the torch, though not in use, is held ready for use, a pilot flame shall be burning from its tip, to afford ignition when the torch is put to use.

The tip of a cutting torch of a well-standardized type is an essentially tubular device having a central axial passageway for cutting oxygen, and surrounding, concentrically arranged, passageways for a combustible mixture of fuel gas and oxygen. It is conventional to make the tip either of a single blank of metal properly machined to provide the necessary passageways, or to make it of two tubular members and to assemble them telescopically. The tip is at one end, the head end, adapted to be brought to bear in gas-tight union upon a seat formed in the head of the torch, and there secured by means of a threaded union or coupler. At the opposite end, the delivery end, a ring of orifices surrounds the outlet of the central passageway for the cutting oxygen, and these orifices collectively provide the outlet for the combustible mixture of gas and oxygen. When the tip is assembled with the torch and is in service, the combustible mixture is delivered from the ring of orifices, and the intensity of flow is, by means of valves in the torch, regulated to sustain at the will of the operator either a pilot flame or a heating flame.

In service the extreme temperatures developed in the immediate vicinity of the delivery end of the tip in the presence of oxygen cause such end of the tip to soften or melt, unless the operator takes great care at all times that the end of the tip be held at exactly the right interval away from the work.

The object of the invention is to provide a tip which is many times more durable in service than any of the tips known heretofore.

As set forth in my copending application for patent, Serial No. 23,669, filed on even date with this, a major problem in the art has always been to provide a tip which will endure for a reasonably long period of service, and the art is replete with patented structures directed to a solution of this problem. While many improvements have been made in tip structures, this basic problem has remained unsolved. The tips most widely used hitherto have been constructed of copper or copper alloys, but these tips in relatively short periods of service become permanently mutilated under the effects of heat, oxygen and rough usage, wherefore they must be frequently replaced at considerable cost to the users. Refractory and thermal insulating inserts have been proposed for the delivery ends of tips, with the thought of providing at the most vulnerable part of the tip structure increased resistance to the mutilating effects of heat and oxygen, but none of the proposed structures has proved adequate and commercially practical.

My present invention embraces the discovery that a class of metals known as sintered carbides may be so formed and embodied in a tip structure as to provide an effective armor that withstands the effects of heat and oxygen, and remains free from contamination by molten metal encountered in service. In the successful application of this discovery, the tips known heretofore are substantially altered or modified in construction, as will appear in the ensuing specification.

It may further be noted that a cutting tip of the invention has a sintered carbide shoe so incorporated in the tip structure as to give a tip at only four or five times the cost of tips now commonly supplied to the art, while affording a service life ten times longer, and more. Additionally in a tip constructed in accordance with my invention, the sintered carbide shoe, while to all intents and purposes constituting a permanent element of the integrated tip structure, may be recovered from a worn tip and reprocessed for use again in a new tip, thereby increasing still further the great economies attending the practice of the invention.

The invention will be understood upon reference to the accompanying drawings, in which.

Figure 1:
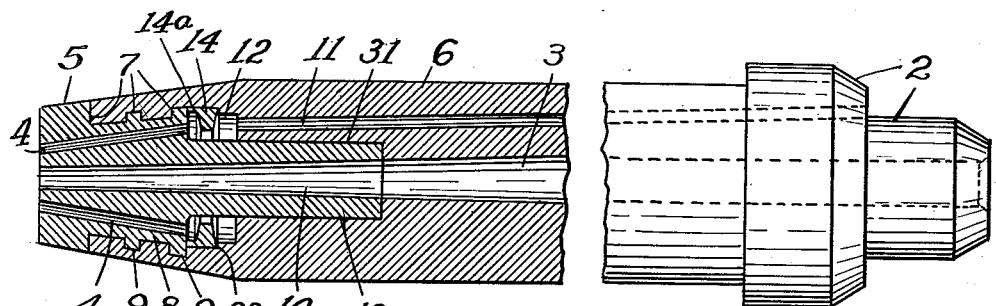
Figure 1 is a view partly in axial section and partly in side elevation of an integrated tip structure embodying the invention.

Referring to Figure 1 of the drawings, an exemplary tip of the invention is illustrated. It comprises a body 6 including a head end 2 for attachment in usual manner to the head of a torch, (not shown) and a delivery end that is shod with an element 5. The main body portion 6 of the tip is tubular, that is, it includes an axial bore 3 in precise registry with a bore 10 in the shoe 5, and through the axial passage thus provided a stream of cutting oxygen is delivered from the torch. The main body of the tip also includes one or more eccentrically extending passages 11 that feed from the torch a mixture of combustible gas and oxygen into a mixing chamber 12, later described, and from such chamber a plurality of flame sustaining jets are delivered through a concentric ring of passageways 4 in the shoe 5.

The main body 6 of the tip may be formed of copper, brass, aluminum or other suitable material, which desirably is ductile or formable under pressure or swedging stress. And such material is readily machinable, and has a relatively high coefficient of thermal conductivity. The shoe 5 is formed of a sintered carbide which is, as known, exceedingly hard and resistant to wear and deformation. Such a shoe 5 is highly refractory, and contrary to expectations it retains its hardness and integrity when exposed to heat at the welding or melting temperatures of steel in the presence of the oxygen delivered with the fuel gas through the tip. In the assembly of this invention the carbide shoe is resistant to thermal fracture, and possesses characteristics of thermal expansion which are distinctly compatible with the relatively formable material of which the remainder of the tip is formed. The main body portion 6 of the tip is relatively destructible under the rough usage to which it is exposed in service, while the shoe 5 is relatively durable, and even though the tip structure in its entirety is serviceable for over twenty-five times the life of the tips hitherto in use, the relatively destructible body portion 6 eventually becomes mutilated to the extent that the tip must be renewed. In accordance with the invention, however, the life of the shoe 5 is not sacrificed to the dissipation of the remainder of the tip. The shoe 5, as will presently appear, is assembled with the body portion 6 in a hermetic joint which to all intents and purposes is an indestructible or permanent union, but which indeed is only so from an utilitarian standpoint. When the tip at length fails because of the mutilation of the portion 6, the joint 7 may be intentionally broken and the shoe recovered for use again with a new body portion 6 to form a new tip.

The sintered carbide of which the shoe 5 is formed may comprise the hard carbide of tungsten, or tantalum, or titanium, or silicon, or zirconium, or beryllium, or thorium, or vanadium, or chromium, or molybdenum, or uranium, or boron, or the alloys of mixtures of such elements with each other and/or iron. The particular method of compounding and forming articles of such sintered or cemented carbides is well known in the metallurgical art and need not be dwelt upon in this specification directed to the torch tip art.

The sintered metallic carbide shoe 5 comprises a perforate flanged head portion to which the reference numeral 5 is immediately applied, and a neck portion 8 of smaller diameter, or girth, equipped with at least one annular collar, and a tubular portion or pipe 13. The neck portion 8 has preferably two or more integral annular collars 9 designed in the assembly of the shoe with the body portion 6 to form an interlocked, hermetic, rib-and-groove union. The flanged head or cap portion 5 of the shoe overlies and caps and protects the terminal face (7, Fig. 1) of the body portion 6 at the discharge end of the tip, while the neck portion 8 is received telescopically and embedded in the enveloping substance of the body portion 6. The bore or passage 10 in the shoe is aligned with and forms a continuation of the bore 3 of the body 6. In this case the bore of the tip desirably is tapered from a point partway of its extent toward the delivery end of the tip structure. The bore 10 in the shoe is preformed to the final size and shape desired in the finished tip, and the bore 3 in the body 6 is fashioned to form a smooth continuation of the bore 10, as may be understood upon considering Figure 1 of the drawings.

Figure 2:
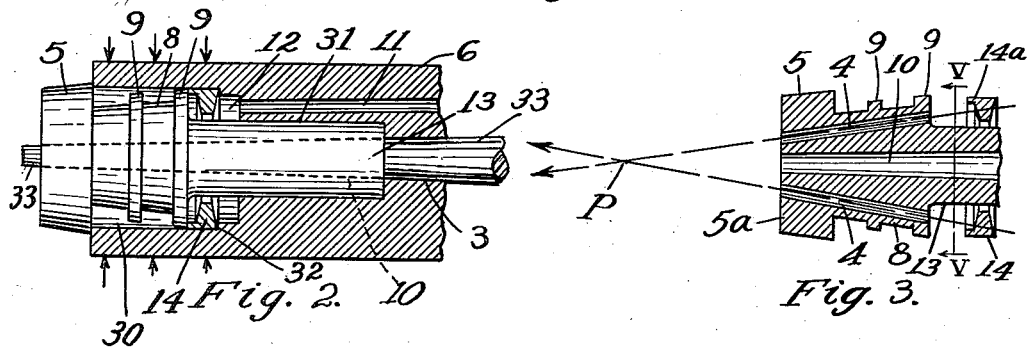
Figure 2 is a fragmentary sectional view of the tip of Figure 1, showing the shoe portion in assembled position at the delivery end of the tip structure, ready for integration with the main tip body.

In the manufacture of the tip structure the shoe 5 and the body 6 are substantially completely produced in preliminary procedures with which this invention is not immediately concerned. The body portion 6 of tip, comprising a tubular member of ductile or formable material, as noted in the foregoing context, may be formed with its bore 3 of uniform diameter, save at the end where the bore is provided in larger diameter, as indicated at 30 and 31, to receive telescopically the neck and tube portions 8 and 13, respectively, with the flanged head portion (5) of the shoe positioned over the terminal edge of the bore portion 30, as shown in Figure 2. A feature of the tip structure consists of a baffle ring 14 which is positioned in the mixing chamber 12 between the outlet of passage 11 and the inlets to passageways or bores 4 in the shoe. This ring serves to effect a distribution in chamber 12 of the fuel gas and oxygen mixture delivered by passage 11, in order that all of the passageways 4 shall be supplied with the gaseous mixture in equal volume and at uniform velocity. It will be noted that the ring 14 is positioned between the neck portion 8 of the sintered carbide shoe 5 and a shoulder 32 in the wall of bore 30. The ring 14 includes an annular flange 14a that makes immediate contact with the inner end of neck portion 8, and the radially extending body proper of the ring 14 is spaced from the inlet ends of the passageways or orifices 4. The inner edge of the ring encompasses in close but spaced relation the body of the tube portion 13 of the shoe 5, and the opposite faces of the ring are inclined as viewed in cross section. These particular features of construction and organization of the ring 14 in the assembled structure insure that the gaseous mixture delivered by the passage 11 will be distributed throughout the annular chamber 12, and will be fed in equal quantities to all of the passageways 4.

When the shoe 5 and ring 14 have been assembled in the body 6, as shown in Figure 2, a mandrel 33 may be inserted to support the parts in true alignment. With the parts thus assembled the ductile or formable body portion 6 is compressed or swedged in a press or other suitable machine, and under pressure applied as indicated by the arrows in Figure 2 the material of the body portion 6 is shaped upon the neck and tube portions 8 and 13, and is snugly engaged upon the collars 9 and the inner face of the flange of head portion 5. The integrated assembly is finished in the form of the structure shown in Figure 1, with the parts interlocked in a tight, hermetic union. The external surface of the compressed and shaped body of the portion 6 may be machined and buffed, whereby the assembled parts partake of integrity in appearance as will in structure. The external surface of the head or cap portion (5) of the shoe is polished or buffed to a mirror finish, whereby smoke generated by the combustion of the fuel gas when the tip is in service will not accumulate on the end of the tip and cause bits of molten steel, splattering upward during a cutting operation, to weld or adhere to the end of the tip, with the obvious objections which have been encountered in prior tip structures.

Figure 3:
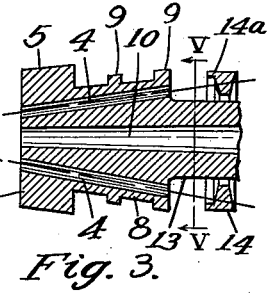
Figure 3 is a fragmentary sectional view of the shoe and a certain baffle ring embodies in the tip of Figures 1 and 2.
Figure 4:
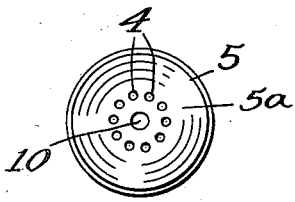
Figure 4 is a view in end elevation of the shoe, as seen from the left of Figure 3.
Figure 5:
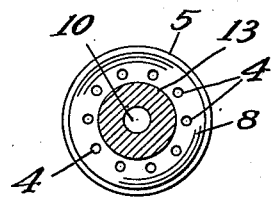
Figure 5 is a view of the shoe in cross section, as seen on the plane V—V of Figure 3.

There is an exceedingly important improvement obtained by virtue of the shoe described. It will be perceived that the passageways 4 that open through the face 5a of the head portion 5 comprise continuations of the passage (or passages) 11 that deliver the combustible gaseous mixture from the torch, and that these passageways are inclined at a substantially greater inclination than passage 11. These passageways 4 are not formed by grooves in the external surface of the shoe portions 5 and 8, but comprise smoothly drilled bores of round cross section. These passageways 4 converge from their inlets in the inner end of the neck portion 8 to their outlets in the face of head portion 5, and the degree of convergence is such that the jets of combustible mixture delivered thereby intersect at the point P where the arrows intersect in Figure 3. This intersection of all of the jets of gas delivered by passageways 4 affords what is known as poly-impingement at the point P, and within practical limits of construction and manufacturing procedure it is possible in the structure of this invention to locate the point of poly-impingement from $\tfrac{3}{16}''$ to $\tfrac{1}{2}''$ from the face 5a of the shoe. Thus, a maximum concentration of the heating flame developed and sustained by the jets fed from the passageways 4 is obtained at the precise distance at which the delivery end (5a) of the tip is spaced (for best results) from the surface of the metal under attack. Additionally, the jet of cutting oxygen delivered by the passage 10 intersects the heating flame at the point P of poly-impingement, and greatest efficiency in heating and cutting metal is achieved.

Figure 6:
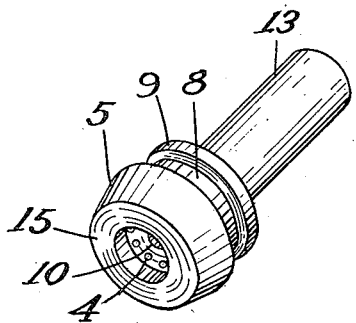
Figure 6 is a view in perspective of the shoe, showing one of the several modifications which lie within the spirit of the invention defined in the appended claims.

Many modifications are permissible within the spirit of the invention defined in the appended claims. The structure shown in Figure 6 is provided with an annular extension 15 that forms a guard for the outlet ends of the passageways 4 and 10. The extension 15 also forms a windshield which prevents wind from disturbing the heating flame springing from the end of the tip structure. The obtainment of these desired features in an integral shoe is a new and valuable improvement in the blow-pipe art.

The application for this patent comprised a continuation-in-part of an application, Serial No. 750,183, filed by me on May 24, 1947.

I claim:

1. In a blow-pipe tip, an elongate tubular body comprised of a metal of relatively low strength and durability when exposed to steel at fusing temperature in the presence of oxygen, said tubular body having a delivery end with a terminal face, a sintered carbide shoe on said delivery end, said shoe having a flanged head portion overlying the terminal face at said delivery end and a neck portion integrally embodied in such end, with an annular chamber formed between the latter portion and said tip body, the tip body including a passage leading to said chamber, a plurality of bores leading from said chamber through said portions of the shoe, said bores being inclined in the direction of their extent from said chamber toward a point of poly-impingement spaced from the delivery end of the tip, said shoe being characterized by relatively great durability when exposed to steel at melting temperature in the presence of oxygen and in the assembled structure comprising a fracture-resistant guard for said body of the tip, and an annular baffle extending inwardly from said tip body adjacent to its delivery end into said chamber and athwart the line of flow between the delivery end of the passage in the tip body and the inlets to said bores in the shoe.

2. In a blow-pipe tip, an elongate tubular body comprised of a metal of relatively low strength and durability when exposed to steel at fusing temperature in the presence of oxygen, said tubular body having a delivery end with a terminal face, a sintered carbide shoe on said delivery end having a central bore aligned with the bore of said tubular body, said shoe having a flanged head portion overlying said terminal face at said delivery end and a neck portion integrally embodied in such end with an annular chamber formed between the latter portion and said tip body, the tip body including laterally of its bore a passage leading to said chamber, said portions of the shoe including laterally of said central bore a plurality of passages leading from said chamber outwardly through the shoe and being inclined in the direction of their extent from said chamber toward a point of poly-impingement spaced from the delivery end of the tip, said shoe being characterized by relatively great durability when exposed to steel at melting temperatures in the presence of oxygen and in the assembled structure comprising a fracture-resistant guard for said body of the tip, and an annular baffle extending inwardly from said tip body adjacent to its delivery end into said chamber and athwart the line of flow between the delivery end of said passage in the tip body and the inlets to said passages in the shoe.

DANIEL A. MARRA.

(References on following page)

References Cited in the file of this patent

UNITED STATES PATENTS

| Number | Name | Date |
|---|---|---|
| 1,114,706 | Brosseau | Oct. 20, 1914 |
| 1,136,490 | Smith | Apr. 20, 1915 |
| 1,266,858 | Reyburn | May 21, 1918 |
| 1,281,871 | Strobot | Oct. 15, 1918 |
| 1,297,058 | Anderson | Mar. 11, 1919 |
| 1,324,866 | Wilcox | Dec. 16, 1919 |
| 1,335,569 | Errett | Mar. 30, 1920 |
| 1,365,600 | Peir et al. | Jan. 11, 1921 |
| 1,597,554 | Thorpe et al. | Aug. 24, 1926 |
| 1,679,586 | Quelch | Aug. 7, 1928 |
| 1,693,838 | Faudi | Dec. 4, 1928 |
| 1,941,467 | Fausek et al. | Jan. 2, 1934 |
| 1,955,120 | Fausek et al. | Apr. 17, 1934 |
| 2,181,135 | Kehl | Nov. 28, 1939 |
| 2,266,834 | Walker et al. | Dec. 23, 1941 |
| 2,294,392 | Egger et al. | Sept. 1, 1942 |
| 2,317,786 | Lubbe | Apr. 27, 1943 |
| 2,343,958 | Crow | Mar. 14, 1944 |
| 2,365,411 | Jacobsson | Dec. 19, 1944 |
| 2,376,413 | Babcock | May 22, 1945 |

OTHER REFERENCES

Metals Handbook (1939 edition), published by Amer. Society for Metals, page 915. Copy in Scientific Library.